May 2, 1961  K. E. A. JOELSON  2,982,254
VIBRATOR
Filed Sept. 20, 1957  2 Sheets-Sheet 1

Fig. 2ª

INVENTOR.
KARL EVERT ANDERS-JOELSON
BY
Albert M. Parker
ATTORNEY.

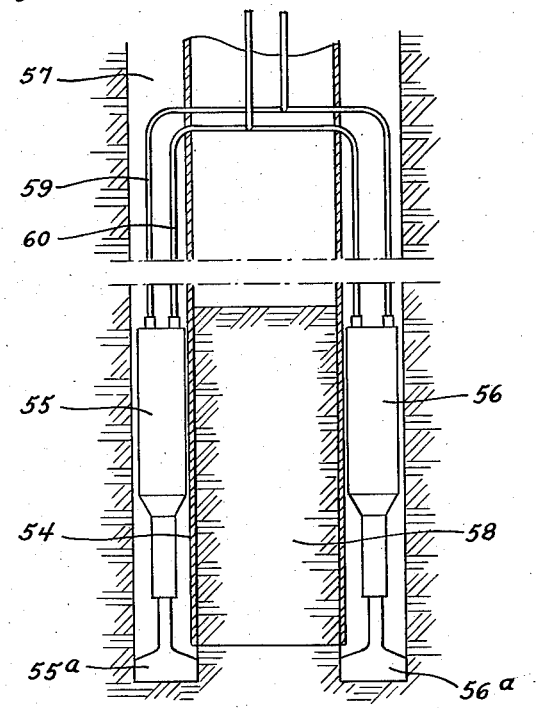
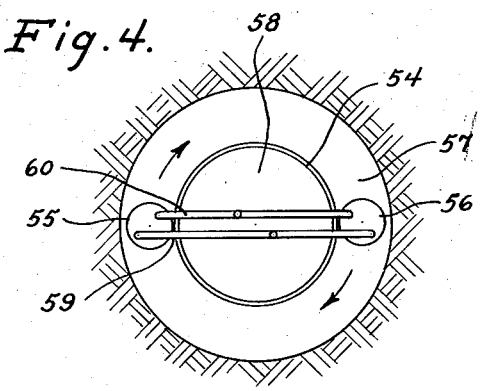

United States Patent Office 2,982,254
Patented May 2, 1961

2,982,254
VIBRATOR

Karl Evert Anders Joelson, Nykoping, Sweden, assignor to Aktiebolaget Industrikompaniet, Stockholm, Sweden, a corporation of Sweden Filed Sept. 20, 1957, Ser. No. 685,299

Claims priority, application Sweden May 24, 1957

12 Claims. (Cl. 121—16)

The present invention refers to a vibrator comprising a piston with projecting piston rod moving up and down in a cylinder and a valve body moving in a valve housing to direct pressure fluid to the cylinder. The piston rod side of the piston is subjected to permanent pressure from a hydraulic pressure source and the other side of the piston is adapted to be alternately connected with the pressure source and with an outlet according to the position of the valve. The invention aims at providing a vibrator of this type that is simple in design and with the hydraulic fluid as a power source can work at high frequency without disturbing noise. An example of the use of the vibrator is rock drilling by means of hard metal carbide tipped percussion drills or bores where it is desired to have a percussion frequency higher than is possible with compressed air machines.

The main characteristic of the invention is that the valve body is adapted to be actuated by the motion of the piston by means of one or several spring members which cooperate with the piston during the whole of the stroke of the latter, as distinguished from the case with certain well-known constructions where the springs cooperate with the piston only when the latter reaches its end positions of the stroke. With the arrangement of the invention, both the piston and the valve body operate as freely oscillating bodies without their end positions being positively set by any fixed stops so that a fully developed oscillation will take place. The whole device therefore works quietly and with great speed. The said spring member can, for example, consist of two compression or coil springs acting against each other and preferably permanently engaging, under a certain pre-tension, a driver, dog or similar device between the piston and the valve body. In this way the piston and the valve body move as two oscillating masses connected to each other through said spring system, when moving at the desired frequency (for example 4,000 vibrations or strokes per minute or higher for example 5,000–6,000 vibrations or strokes per minute). The frequency and the length of the stroke are dependent on the spring constant, the quantity of fluid and the fluid pressure. An increased quantity of fluid implies an increased piston travel per unit of time and an increased fluid pressure implies an increased piston acceleration. A weak spring implies long strokes, that is, a low frequency, while a strong spring means shorter strokes, that is, a high frequency.

The invention will now be described in greater detail with reference to the more or less diagrammatic longitudinal sections of some embodiments of the invention shown in Figures 1 and 2 on the accompanying drawings.

Fig. 3 is a longitudinal section of another embodiment of the invention, and

Fig. 4 is a top plan view thereof.

Figure 1:
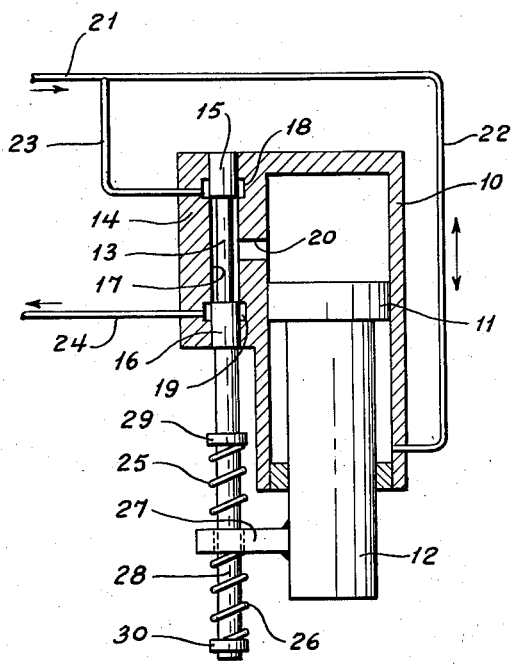
Figure 1:
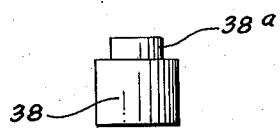

In Fig. 1, 10 is a cylinder in which a piston 11 is adapted to move axially. The piston is mounted on a piston rod 12 or similar device which passes sealingly through one end wall of the cylinder and which has an area preferably approximately half that of the piston 11. A valve spindle 13 is axially movable in a valve housing 14 which is fitted to or is made integrally with the cylinder 10. The directions of movement of the piston and the valve spindle are preferably parallel. The valve spindle is fitted with two cams or slide valve heads 15, 16, which fit in a recess 17 in the valve housing and which according to their position relative to said recess open or close the communication between a recess 18 or 19, respectively, and a passage 20 leading to the cylinder above the piston 11. A pipe 21 from a hydraulic pressure source is in permanently open communication with the chamber under the piston 11 through a branch pipe 22 and with the recess 18 through another passage 23. An outlet 24 leads from the recess 19.

The movements of the piston 11 are transmitted to the spindle 13 via either of two springs 25, 26 which are tensioned against each other. In the diagrammatic figure the piston rod 12 has a driver arm 27 which with a clearance or free motion is fitted on the portion 28 of the valve spindle projecting outside the valve housing. The springs engage the arm 27 and the abutments 29, 30, on the valve spindle; they are preferably pre-tensioned slightly. A movement of the piston 11 in either direction first compresses the corresponding spring and then moves the valve spindle.

The vibrator operates in the following way:

There is always a force acting on the bottom of the piston 11 which is equal to the specific pressure of the hydraulic fluid multiplied by the annular piston area outside the piston rod 12, said area as mentioned above, usually being about half the area of the top side of the piston. If the valve spindle 13 is in such a position that the valve head 16 affords an open communication between the upper cylinder chamber and the outlet 24 while the hydraulic fluid supply through the passage 23 is blocked by the valve head 15, then the piston will be subjected to an upward force equal to half the piston area multiplied by the specific hydraulic pressure. If on the other hand the valve spindle 13 is in the upper position so that the outlet 24 is blocked while the hydraulic fluid is supplied to the upper piston chamber through the recess 18, then the upper side of the piston will be subjected to a force which is equal to the whole piston area multiplied by the specific hydraulic pressure. In this case, however, there will act, at the same time, on the bottom of the piston an upward pressure which is half as great, since said bottom is permanently actuated by the pressure from the pressure source. The resultant downward force will therefore be the same as the upward force in the first mentioned position of the valve spindle.

Thus, in order that the piston 11 should be in equilibrium the pressure on the free piston side should be half of the pressure on the piston rod side. This may be obtained if the valve spindle 13 is in the neutral position shown in the figure, in which the supply of hydraulic fluid through the passage 23 and the discharge of fluid through the passage 24 are both blocked so that the specific hydraulic pressure in the upper part of the cylinder is half that of the hydraulic pressure in the lower part. The moving elements of the vibrator have a tendency, if they are not disturbed by outside forces, to move to this neutral position and even after being displaced from this neutral position to endeavour to resume it. They are however prevented from remaining in this position because of the resilient coupling between the piston 11 and the valve spindle 13. If the piston has been forced upwards under the action of an external force, as in the figure, the spring 25 is compressed so that the valve spindle 13 is pushed up. This opens the supply of hydraulic fluid through the passage 23 and blocks the outlet 24. The pressure on the top side of the piston 11 is greater and the piston is forced down. This compresses the spring 26 and in turn draws the valve spindle 13 downwards. The hydraulic fluid supply to the upper cylinder chamber is interrupted and instead communication with the outlet 24 is opened. The upwards forces on the piston 11 are prevailing so that the piston moves upwards. The whole process results in a rapid reciprocating movement of the piston 11 and consequently also of the valve spindle 13. The neutral position is always passed and the frequency of the movements of the two elements is very high.

When a new stroke begins, the piston 11 will thus move at an accelerating speed and will drive the valve spindle 13 in the same direction but it should be noted that due to the inertia of the valve spindle and the spring coupling with the piston, the valve spindle will lag behind and the spring will be compressed by a force corresponding to the acceleration force of the motion of the valve spindle. When the valve spindle has passed the neutral position and arrives to the position in which the hydraulic pressure is reversed the piston will be stopped and reversed but the valve spindle will continue further until the spring system has been released and stressed sufficiently in the other direction to be able to slow down the valve spindle to stop it and then to start its movement in the other direcion.

The frequency and amplitude of the vibrator and its piston, respectively, can be regulated by altering the strength or the length of the springs 25 and 26. A control can also be provided within limits by varying the hydraulic pressure and the quantity of fluid. The hydraulic pressure can for instance be 50 to 100 kilograms/centimeter$^2$. In one design with 5,000 to 6,000 strokes a minute, the pressure was 70 kilograms/centimeter$^2$; the liquid consumption, 120 liters/min.; stroke energy 6.4 kilogram meters/stroke; stroke length, 8 millimeters and piston speed, 6.5 metres/sec. The invention is, however, in no way limited to these figures.

The hydraulic fluid may, for example, be oil or water. In rock drilling flushing water is fed to the drilling holes. The driving liquid required for the vibrator is about the same as the amount of flushing liquid needed. It is therefore possible when drilling at great depths, such as some 100 metres, to drive the vibrator with water from the ground level without any supply of external energy since the energy due to the level of water is sufficient for driving the vibrator. The piston rod 12 can be connected directly with the drill so that they both vibrate together, or the piston rod 12 and its associated elements can transmit their vibratory movement to the drill shank.

The invention can be applied in many other fields such as in excavating and loading machines; the vibrator then being coupled with the exacavating elements to facilitate their digging into the material being loaded. Further applications in which the vibrator can be used with advantage are: releasing material in funnels and bins by shaking, conveying material in feed channels and dewatering of various materials (for example, thickening beaten pulp).

If the machine is used as an impact machine the coupling between the piston rod and the tool is adjusted so that the impact occurs before the piston motion meets the counter pressure for the liquid. This brakes the working piston so that the valve spindle catches up and reverses the direction of motion.

If a pressure reduction valve or similar device is used so that the hydraulic pressure on the piston rod side of the piston for instance is lower than the hydraulic pressure in the passage 23, the hydraulic forces acting on the two sides of the piston can nevertheless be made equal or approximately equal by a corresponding choice of the relationship between the outer diameters of the piston and piston rod.

Figure 2:
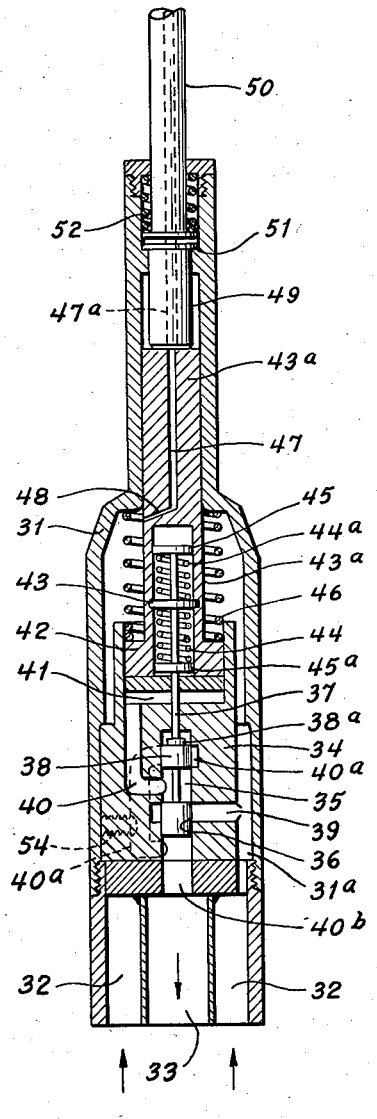
Fig. 2a is an elevation of one of the valve elements of Fig. 2 per se.

Fig. 2 shows an embodiment of the invention for use in a percussion drilling machine. This machine consists of two concentric tubes 32 and 33. The liquid is supplied between these two tubes while the inner tube 33 serves as outlet. The tubes also guide the machine and rotate it in the drilling hole. The tube 32 is fixed to a casing 31, fitted with a block 34 which has a chamber 35 in which the slide valve heads 36, 38 can slide in axial direction so as to open and close communication between chamber 35 and an inlet passage 39, on one side and an outlet passage 40a, on the other side. Valve head 38 has a radially reduced portion 38a at its end facing the closed end portion of chamber 35. This reduced portion provides an annular groove through which the fluid in said closed end portion of chamber 35 may be discharged via outlet passage 40a. The valve heads 36, 38 are fixed on a valve spindle 37. The hydraulic fluid enters from the tube 32 to a passage 31a inside the casing 31 and passes from there through the inlet passage 39 but is prevented from entering chamber 35 while the valve head 36 is in the closed position as shown in the drawing. When the valve head 36 together with spindle 37 moves slightly outwardly from the Fig. 2 position in a direction towards the open end of chamber 35 the hydraulic fluid will be admitted to the portion of the chamber 35 located between the valve heads 36, 38; from here the fluid can pass through the permanently open communicating passage 40 to a piston chamber 41 on one side of the piston 42. In this position valve head 38 shuts off communication between the chamber 35 and outlet passage 40a. When spindle 37 moves in the opposite direction so as to carry valve head 38 toward the closed end of chamber 35 communication is opened from chamber 35 to outlet passage 40a but communication between passages 39 and 35 is cut off. Outlet passage 40a communicates with a passage 40b leading to the inner tube 33.

The valve spindle 37 extends coaxially through the piston 42 and mounted on this spindle are two collars or abutments 45 and 45a. The spindle 37 is guided axially by being mounted to slide through a third collar or abutment 43 fixed in an extension 43a of the piston 42. Tensioned between said abutment 43 and the abutments 45, 45a are counteracting springs 44, 44a. These springs correspond in function to the springs 25 and 26 in Fig. 1. In addition the piston is actuated by a spring 46 which tends to force the piston 42, the spindle 37 and thus the valve heads 36 and 38 to the position in which valve head 36 opens communication between inlet passage 39 and chamber 35 so as to start the machine by the action of the hydraulic fluid supplied to piston chamber 41 from inlet passage 39 via chamber 35 and passage 40 as soon as said hydraulic fluid enters the tube 32.

On starting the machine spring 46 forces the piston 42 downwardly in Fig. 2 and through the intermediary of springs 44, 44a piston 42 moves spindle 37 and valve head 36 to the position in which said valve head admits hydraulic fluid from inlet passage 39 into chamber 35 and from there through passage 40 to piston chamber 41 on the lower side of the piston 42. The upper surface of the piston has a smaller effective area than its lower surface but also the upper surface is exposed to the pressure from the hydraulic fluid which is supplied from passage 31a. Due to this difference in effective area the pressure on the lower side of the piston will predominate over the opposed pressure on the upper side of the piston plus the action of the spring 46 so that the piston is caused to reverse its motion and to move upwardly, carrying with itself the spindle 37 and the valve system 36, 38, yet with a certain lag or delay on account of the elasticity of springs 44, 44a. When valve head 36 closes inlet passage 39 again during the upward motion the supply of hydraulic fluid to the lower side of piston 42 ceases. After a short period of time valve head 38 opens communications between chamber 35 and outlet passage 40a so as to relieve the pressure on the lower side of piston 42. Then said piston will reverse its motion again. The operation is now repeated so that the piston 42 together with its piston rod 43a will obtain a rapid reciprocating (vibrating) motion. The piston and the valve system move as two freely oscillating masses which are interconnected through the spring system 44, 44a in which the springs permanently are pressed against the intermediary abutment 43. The springs 44, 44a are compressed alternately according to the motion of the piston in one direction or the other and during continuous operation the spring system 44, 44a, serving as motion transmitting elements creates the suitation where the valve system may move in opposite direction to but synchronously with piston 42.

The piston stroke and frequency can be adjusted by a throttle screw 54 which can be caused to close the passage 40a to a higher or smaller degree. This adjustable throttle can also be fitted elsewhere in the hydraulic system.

The piston extension 43a contains a passage 47 which, through a constricted passage 48 and the space inside the casing 31, communicates with the inlet passage 31a for the hydraulic fluid. This restricted part of the hydraulic fluid flowing to the passage 47 enters a passage 47a in the drill bar 50 and serves as flushing liquid while drilling. The vibration movements of the piston 42 and its extension 43a are transmitted to the drill shank 49. The drill bar 50 can move axially but is prevented from rotating by suitable means engaged therewith. A spring 52 pressing against a collar 51 on the drill bar 50 prevents the bar from falling out of the machine. A sealing ring can be fitted in a peripheral groove in the drill collar 51 to prevent flushing liquid leaking away uselessly.

The machine shown in Fig. 2 can be designed with dimensions small enough to allow it to be fitted into the drilling hole itself so that deep drilling can be done without having to fit extension rods.

Figs. 3 and 4 show diagrammatically how the machine can be used to obtain a core of the material being drilled through. For this type of drilling it has hitherto been customary to use a tubular drill bar which rotates around the core and drills out the material so that the central core enters the space in the centre of the hollow drill.

Since the present invention makes it possible to produce small diameter machines, due to the high pressure of the hydraulic liquid it is now possible to use two or more of such drilling machines 55, 56 as shown in Fig. 3 connected to hydraulic supply conduit and discharge conduit 59, 60 respectively and arranged on a common tube 58 which is rotated in the drilling hole 57 while the drilling machines effect their vibrating percussion movement and cut out the material by means of the hard metal bits 55a, 56a. The result is that the material is drilled out in a ring while leaving a central core of material 58 in the tube 54.

The hydraulic percussion drilling or boring machine described can be used in this way to cut out drilling cores and gives a lower capital cost and higher drilling speed than can be obtained by earlier rotating drills.

What I claim is:

1. A vibrator comprising in combination a cylinder with a piston, having a piston rod, means for reciprocating said piston in said cylinder, a hydraulic pressure source, a valve housing with a valve body for supplying hydraulic fluid from said pressure source to said cylinder so as to subject the piston rod side of the piston to a permanent pressure from said pressure source, means to connect alternatively the opposite side of said piston with the pressure source and with an outlet for said fluid, respectively, according to the position of the valve body, and a driver element interposed between the piston and the valve body, and spring means operatively interconnecting the valve body with the piston through the intermediary of said driver element and positively engaging said driver element throughout the whole of the stroke of said piston, said piston and said valve body being arranged as freely oscillating bodies devoid of any positively fixed reversing positions of their oscillation movements.

2. A vibrator according to claim 1, wherein two spring members acting in opposition and under compression engage said driver element.

3. A vibrator according to claim 1, wherein the piston areas exposed to the pressure of said hydraulic fluid are dimensioned relative to the specific hydraulic pressure so that the pressure force acting on the piston rod side is at least approximately half of the pressure force on the other side of the piston.

4. Vibrator according to claim 1, wherein the area of the piston exposed to the pressure of said hydraulic fluid on the piston rod side is half as large as that of the opposite side of said piston in the case that the specific hydraulic pressure is the same on both sides of said piston.

5. A vibrator according to claim 1, wherein the valve body and said spring means are arranged mainly concentric to the piston, and at least partly within the latter.

6. A vibrator according to claim 1, wherein one of the inlet and the outlet passages of the hydraulic fluid to and from, respectively, the valve body is adjustable for the control of the frequency and the stroke length of the vibrator.

7. A vibrator according to claim 1, wherein two tubes, coaxial with the piston, are arranged for the supply and discharge of the hydraulic liquid.

8. A vibrator according to claim 1, wherein a spring is arranged in operative relationship with respect to the piston to urge the piston and the valve body towards a position in which the valve body opens a hydraulic fluid passage to one side of the piston on the supply of the hydraulic fluid to the vibrator.

9. Vibrator mechanism adapted for use in conjunction with a percussion drill including a rotatable tube, each of said vibrators comprising in combination a cylinder with a piston, having a piston rod, means for reciprocating said piston in said cylinder, a hydraulic pressure source, a valve housing with a valve body for supplying hydraulic fluid from said pressure source to said cylinder so as to subject the piston rod side of the piston to a permanent pressure from said pressure source, means to connect alternatively the opposite side of said piston with the pressure source and with an outlet for said fluid, respectively, according to the position of the valve body, a driver element interposed between the piston and the valve body, and spring means operatively interconnecting the valve body with the piston through the intermediary of said driver element and positively engaging said driver element throughout the whole of the stroke of said piston, said piston and said valve body being arranged as freely oscillating bodies devoid of any positively fixed reversing positions of their oscillation movements, there being at least two of said vibrators, means mounting said vibrators at the periphery of said rotatable tube of said percussion drill and rotatable therewith.

10. A vibrator according to claim 1 wherein said piston and said valve bodies are arranged concentrically.

11. A vibrator according to claim 1 wherein said valve body and said spring means are arranged concentric to the piston.

12. A vibrator according to claim 1 wherein said valve body and said spring means are arranged at least partly within said piston.

References Cited in the file of this patent

UNITED STATES PATENTS

| | | |
|---|---|---|
| 419,147 | Falkenau | Jan. 7, 1890 |
| 787,191 | Krewson | Apr. 11, 1905 |
| 1,665,046 | Tucker | Apr. 3, 1928 |
| 2,406,747 | Davis | Sept. 3, 1946 |
| 2,559,012 | Davis et al. | July 3, 1951 |
| 2,896,542 | Forghieri | July 28, 1959 |

FOREIGN PATENTS

| | | |
|---|---|---|
| 947,975 | Germany | Aug. 23, 1956 |